US011862001B2

(12) United States Patent
Heidari et al.

(10) Patent No.: US 11,862,001 B2
(45) **Date of Patent: *Jan. 2, 2024**

(54) SYSTEM AND METHODS FOR IDENTIFYING A SUBJECT THROUGH DEVICE-FREE AND DEVICE-ORIENTED SENSING TECHNOLOGIES

(71) Applicants: Sam Heidari, Los Altos Hills, CA (US); Michel Allegue Martinez, Terrebonne (CA); Amir Minayi Jalil, Verdun (CA); Negar Ghourchian, Montreal (CA)

(72) Inventors: Sam Heidari, Los Altos Hills, CA (US); Michel Allegue Martinez, Terrebonne (CA); Amir Minayi Jalil, Verdun (CA); Negar Ghourchian, Montreal (CA)

(73) Assignee: Aerial Technologies Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,365

(22) Filed: May 19, 2022

(65) Prior Publication Data

US 2022/0277632 A1 Sep. 1, 2022

Related U.S. Application Data

(63) Continuation of application No. 17/199,952, filed on Mar. 12, 2021, now Pat. No. 11,348,428.

(60) Provisional application No. 62/988,846, filed on Mar. 12, 2020.

(51) Int. Cl.
*G08B 13/24* (2006.01)
*G08B 27/00* (2006.01)
*G08B 21/22* (2006.01)

(52) U.S. Cl.
CPC ......... *G08B 13/2491* (2013.01); *G08B 21/22* (2013.01); *G08B 27/005* (2013.01)

(58) Field of Classification Search
CPC .. G08B 13/2491; G08B 21/22; G08B 27/005; G08B 25/10; G08B 13/24
See application file for complete search history.

(56) References Cited

U.S. PATENT DOCUMENTS 5,099,322 A 3/1992 Gove
7,113,090 B1 * 9/2006 Saylor .................. G08B 25/005 340/539.18
9,659,474 B1 * 5/2017 Kashyap ............ G08B 13/2491
9,693,181 B1 * 6/2017 Albouyeh .............. H04N 7/183
9,961,079 B1 5/2018 Wang et al.
10,048,350 B1 * 8/2018 Piao ...................... G01S 5/0284
10,559,177 B2 2/2020 Feldman et al.
10,600,314 B1 * 3/2020 Manku ................. G08B 29/185
(Continued)

*Primary Examiner* — Curtis J King
(74) *Attorney, Agent, or Firm* — Rosenberg, Klein & Lee

(57) ABSTRACT

The systems and method proposed herein aim to identify a mobile device or devices worn by an individual or a subject that has entered an area monitored by a passive motion detection system that uses wireless signals to sense motion in the space. The system will collect as much signals as possible from both the devices worn by the individual and from the system performing the passive (device-free) motion detection for identifying the individual or person of interest. The individual or person of interest may be a user of a product or an intruder.

23 Claims, 2 Drawing Sheets

(56) References Cited

U.S. PATENT DOCUMENTS

| | | | | |
|---|---|---|---|---|
| 10,726,697 | B2 * | 7/2020 | Thiel | G07C 9/00 |
| 10,847,001 | B2 * | 11/2020 | Teskey | G08B 25/10 |
| 11,195,398 | B1 * | 12/2021 | Fu | G06V 20/52 |
| 11,527,149 | B2 * | 12/2022 | Davies | H04N 23/90 |
| 2004/0135688 | A1 * | 7/2004 | Zhevelev | G08B 13/2491 340/567 |
| 2009/0264155 | A1 * | 10/2009 | Nakayama | G08B 25/14 455/561 |
| 2012/0092158 | A1 * | 4/2012 | Kumbhar | G08B 15/00 340/541 |
| 2015/0080021 | A1 | 3/2015 | Bietz et al. | |
| 2015/0312881 | A1 * | 10/2015 | Agrawal | H04W 64/006 455/456.1 |
| 2016/0035196 | A1 * | 2/2016 | Chan | H04W 68/005 340/541 |
| 2016/0080476 | A1 | 3/2016 | Sandell et al. | |
| 2016/0247374 | A1 * | 8/2016 | Crowe | G08B 15/02 |
| 2016/0328941 | A1 * | 11/2016 | Sundholm | G08B 13/1618 |
| 2017/0086202 | A1 | 3/2017 | Chen | |
| 2017/0148296 | A1 | 5/2017 | Amir | |
| 2017/0221335 | A1 * | 8/2017 | Brillaud | A61B 5/1115 |
| 2017/0365908 | A1 * | 12/2017 | Hughes | H01Q 9/40 |
| 2018/0075723 | A1 * | 3/2018 | Hsiao | G08B 13/2471 |
| 2018/0102032 | A1 | 4/2018 | Emmanuel et al. | |
| 2018/0247508 | A1 * | 8/2018 | Friar | H04W 12/08 |
| 2019/0277959 | A1 * | 9/2019 | Tartaro | G08B 13/2491 |
| 2020/0174452 | A1 * | 6/2020 | Zhao | G08B 29/04 |
| 2021/0097837 | A1 | 4/2021 | Saldin et al. | |
| 2021/0360533 | A1 * | 11/2021 | Neerbek | H04W 52/0254 |
| 2022/0283279 | A1 * | 9/2022 | Menis | G01S 7/415 |

* cited by examiner

SYSTEM AND METHODS FOR IDENTIFYING A SUBJECT THROUGH DEVICE-FREE AND DEVICE-ORIENTED SENSING TECHNOLOGIES

CROSS-REFERENCE TO RELATED APPLICATIONS

This application claims the benefit of priority as a continuation of U.S. patent application Ser. No. 17/199,952 filed Mar. 12, 2021; which itself claims the benefit of priority from U.S. Provisional Patent Application 62/988,846 filed Mar. 12, 2020; the entire contents of each being incorporated herein by reference.

FIELD OF THE INVENTION

This invention relates to subject(s) identification after human motion is detected in the sensing area through a device-free sensing approach.

BACKGROUND OF THE INVENTION

Many currently used wireless communication systems such as LTE, LTE-Advance, IEEE 802.11n, IEEE 802.11ac (Wi-Fi 5), and IEEE 802.11ax (Wi-Fi 6) continuously sense the state of the wireless channel through well-known signals, or pilot signals, in order to dynamically optimize the transmission rate or improve the robustness of the system. These channel sensing mechanisms are continuously improving and enable self-driven calibration systems and wireless signal pre-compensation and post-compensation techniques, significantly improving the quality of wireless communication.

More fine-grained information is available in modern communication systems and several approaches have been proposed in order to improve these systems. For example, a method that provides periodic channel state information (CSI) data has been developed. However, these fine-grained measurements are not only valuable for controlling and optimizing communication networks and links as they can also be used for the purpose of detecting motion or human activities within a sensing area.

Several signals are broadcasted or emitted in type of frames by the stations (STA) and Access Points (APs) in Wi-Fi networks even without requiring association between them. For example, before two devices can associate to each other, each of them can read frames from the environment and each of them can decide to broadcast or send one or multiple frames or wireless signals in general.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to subject(s) identification after human motion is detected in the sensing area through a device-free sensing approach.

In accordance with an embodiment of the invention there is provided a method comprising:

determining motion of a subject within a sensing area in dependence upon analysis of wireless environment data comprising at least one of wireless signals and wireless data received by at least a pair of wireless devices;

making a first determination by determining whether at least one of a media protocol address of a wireless device associated with the subject is new and that there is no correlation of the wireless environment data with at least one of first stored data relating to authorized subjects and second stored data comprising wireless environment data established prior to the determination of motion of the subject;

making a second determination by determining whether at least one of a media protocol address of a wireless device associated with the subject is known and that there is a correlation of the wireless environment data with at least one of first stored data relating to authorized subjects and second stored data comprising wireless environment data established prior to the determination of motion of the subject; and making a third determination by determining whether the subject is not associated with any wireless device.

In accordance with an embodiment of the invention there is provided a method comprising:

determining whether a subject in motion within a sensing area is known or not; and performing an action of a plurality of actions; wherein the performed action of the plurality of actions is established in dependence upon the determination.

In accordance with an embodiment of the invention there is provided a network comprising:

a plurality of wireless devices;

an analytics application in execution upon at least one of a predetermined subset of the plurality of wireless devices and a remote server; wherein the analytics application executes a process comprising the steps of:

determining whether a subject in motion within a sensing area is known or not; and performing an action of a plurality of actions; wherein the performed action of the plurality of actions is established in dependence upon the determination.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
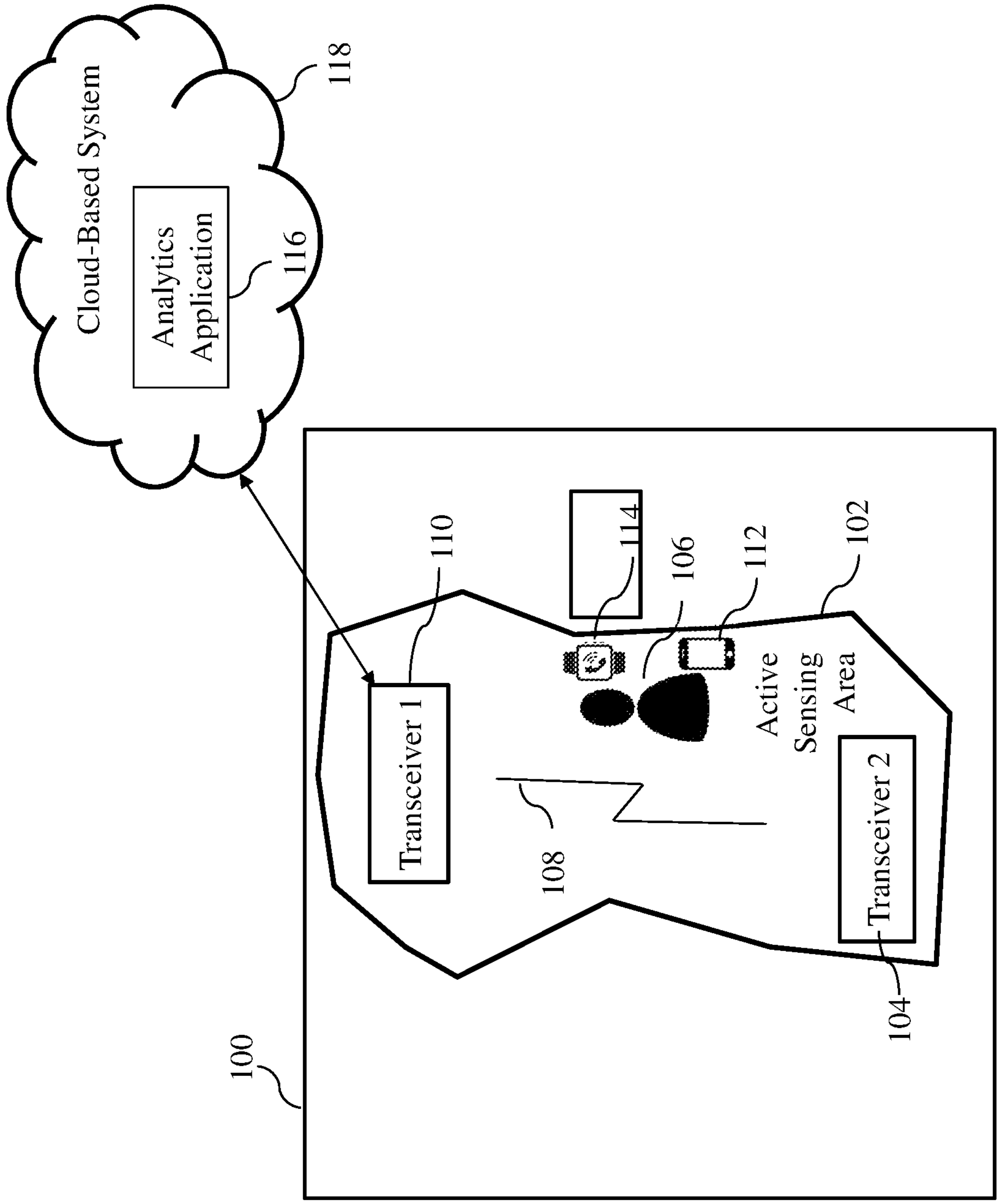
FIG. 1 depicts an exemplary network environment within which an embodiment of the invention relating to wireless device free motion detection is performed.

The present invention is directed to subject(s) identification after human motion is detected in the sensing area through a device-free sensing approach.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "subject" as used herein may refer to, but is not limited to, an individual or group of individuals. This includes, but is not limited to, private individuals, employees of organizations and/or enterprises, an unknown individual or an intruder, members of community organizations, members of charity organizations, men, women, and children. In its broadest sense the user may further include, but not be limited to, software systems, mechanical systems, robotic systems, android systems, etc. that may be characterized, i.e. identified, by one or more embodiments of the invention.

A "transmitter" (a common abbreviation for a radio transmitter or wireless transmitter) as used herein may refer to, but is not limited to, an electronic device which, with the aid of an antenna, produces radio waves. The transmitter itself generates a radio frequency alternating current containing the information to be transmitted which is applied to the antenna which radiates radio waves. A transmitter may be discrete, or it may form part of a transceiver in combination with a receiver. Transmitters may be employed within a variety of electronic devices that communicate by wireless signals including, but not limited to, PEDs, FEDs, wearable devices, two-way radios, and wireless beacons. A transmitter may operate according to one or more wireless protocols in dependence upon its design.

A "receiver" (a common abbreviation for a radio receiver or wireless receiver) as used herein may refer to, but is not limited to, an electronic device that receives radio waves via an antenna which converts them to a radio frequency alternating current wherein the receiver processes these signals to extract the transmitted information. Receivers may be employed within a variety of electronic devices that communicate by wireless signals including, but not limited to, PEDs, FEDs, wearable devices, two-way radios, and wireless beacons. A receiver may operate according to one or more wireless protocols in dependence upon its design.

A wireless transceiver comprises components needed for sending and receiving wireless signals, e.g. radiation system, amplifiers, filters, mixers, local oscillators, ADC and DAC, and any other component required in the modulator and demodulator.

"Device-free technology", the target user(s) or the subject(s) do(es) not require to wear any device with him/her/them in order for the system or the technology to know that there is human motion in the sensing area or to detect the type of activities or not that the subject(s) are performing.

"Device-oriented technology", the target is a device. The system or technology assumes, but not necessarily, that the subject(s) are wearing a device and what is tracked is the device.

A "wireless protocol" as used herein may refer to, but is not limited to, a specification defining the characteristics of a wireless network comprising transmitters and receivers such that the receivers can receive and convert the information transmitted by the transmitters. Such specifications may therefore define parameters relating to the wireless network, transmitters, and receivers including, but not limited to, frequency range, channel allocations, transmit power ranges, modulation format, error coding, etc. Such wireless protocols may include those agreed as national and/or international standards within those regions of the wireless spectrum that are licensed/regulated as well as those that are unlicensed such as the Industrial, Scientific, and Medical (ISM) radio bands and hence are met by equipment designed by a single original equipment manufacturer (OEM) or an OEM consortium. Such wireless protocols or wireless standards may include, but are not limited to, IEEE 802.11 Wireless LAN and any of their amendments, IEEE 802.16 WiMAX, GSM (Global System for Mobile Communications, IEEE 802.15 Wireless PAN, UMTS (Universal Mobile Telecommunication System), EV-DO (Evolution-Data Optimized), CDMA 2000, GPRS (General Packet Radio Service), EDGE (Enhanced Data Rates for GSM Evolution), Open Air, HomeRF, HiperLAN1/HiperLAN2, Bluetooth, ZigBee, Wireless USB, 6IoWPAN, and UWB (ultra-wideband).

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

The system will collect as much information as possible of the device or devices that the subject is carrying on referred to as the target device or devices. Specific interaction (e.g. exchange of wireless signals) with the target device or devices is considered as well in order to maximize the data or information available for a future or immediate identification of the individual or subject. Any information collected during the observation period is used for identifying the individual or subject. The individual or person of interest may be a user of a product or an intruder.

A wireless device-free motion detection system according to an embodiment of the invention is illustrated in FIG. 1. The wireless device-free motion detection system is comprised of at least two transceivers 110 and 104. The transceivers 110 and 104 are associated through any wireless standard, e.g. Wi-Fi. Device-free motion detection has been proven to be possible by looking at the appropriate metrics and/or measurements performed by any of the transceivers because moving objects distort the wireless signals exchanged between transceivers. Accordingly, an area referred to as the active sensing area 102 is created between the devices, which is sensitive to (human and/or pet, and or other moving objects) motion. Active sensing area 102 is within the perimeters of area 100 which could be any residential or commercial space and could include both indoors and outdoors spaces. The system proposed here in should contain at least one active sensing area 102. Integration of multiple sensing areas is considered as well as part of the system proposed herein. The wireless device-free motion detection system can compute the motion detection either locally in the premises or via a local area network (LAN), upon any of the devices of the network, and/or in a cloud-based computing resource(s) 118 as in FIG. 1 through Analytics Application 116.

The system is able to collect, through at least one of the devices in the network, which the transceivers 110 and 104 are connected to, a wide range of information from all or any of the devices (e.g. transceivers 110 and 104) within the area 100. As an example, this information includes but is not limited to Physical Layer (PHY layer), Media Access Control (MAC) sublayer and Logical Link Control (LLC) sublayer which are the two sublayers of the Data Link (DL) Layer of the OSI model. The PHY layer and the DL layer contain information about the frequency response of the channel, and/or phase response of the channel, and/or impulse response of the channel, and/or received signal strength indicators (RSSI), and/or the media access control address (MAC address) and/or, capture of Probe requests, capture of any broadcasting frame before the association between devices, control frames after or before association between devices, any frame related to the association process, and/or any other statistic that describes the wireless communication link between paired devices.

The system in FIG. 1 exploits and quantifies that physical motion has occurred in the sensing area by analyzing the changes and disruption of the wireless measurements collected from the devices, e.g. transceivers 110 and/or 104. In FIG. 1, devices 112 and 114 are also transceivers.

Figure 2:
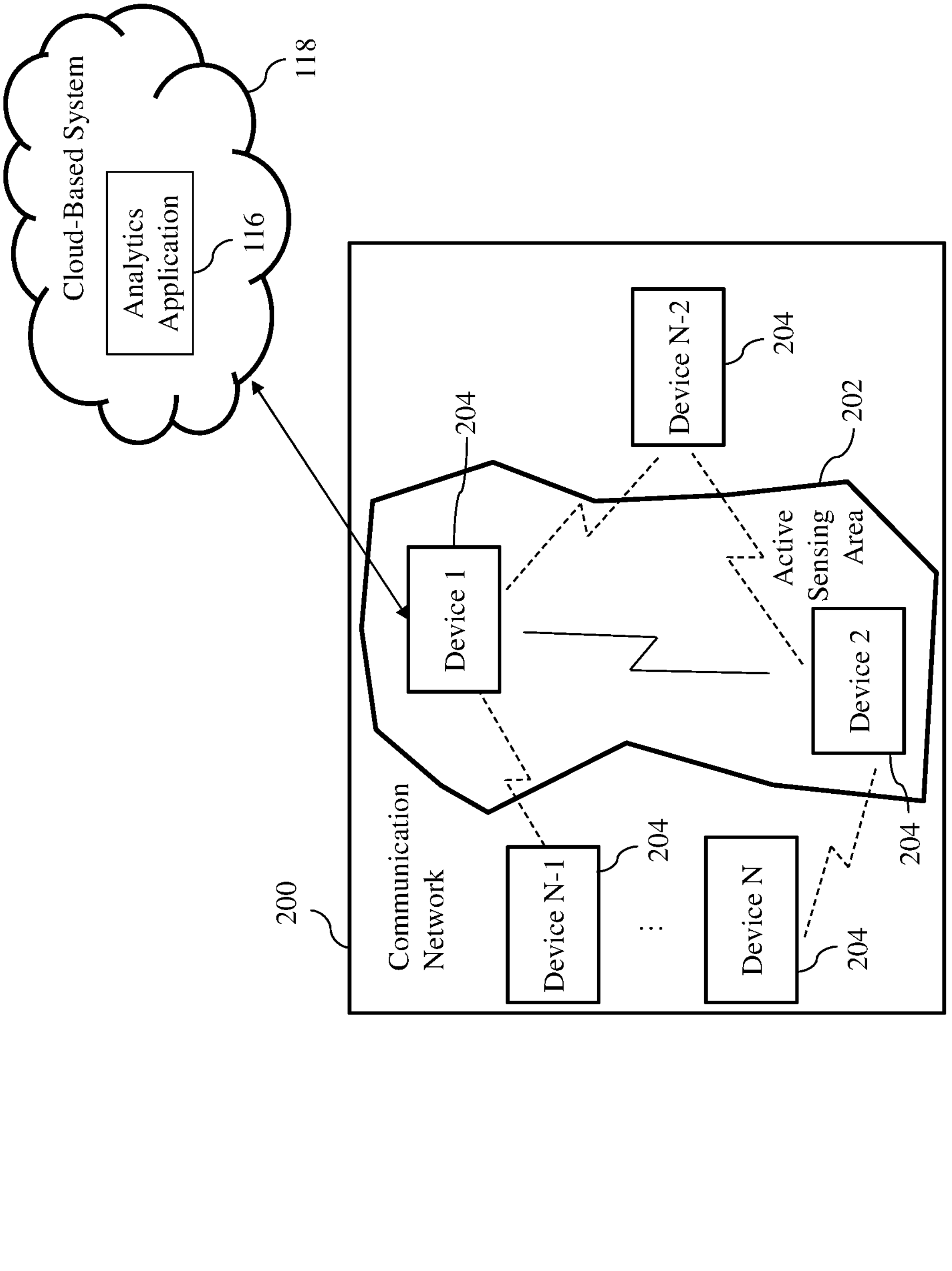
FIG. 2 an exemplary network environment within which an embodiment of the invention relating to wireless device free motion detection is performed.

Now referring to FIG. 2 there is depicted an example of a more general network configuration according to an embodiment of the invention. Within an embodiment of the invention described herein a communication network 200 comprises at least two devices 204 as shown in FIG. 2. In this embodiment, devices 204 comprise the entire communication network. The devices 204 can act as a transceiver 110 and/or 104. By employing two instances of device 204, referred to as Device 1 and Device 2, a sensing area 202 is created as illustrated in FIG. 2.

A portion or all of the analytics application 116 is hosted in a remote facility such as a cloud-based system, for example, such that at least one of Device 1 or Device 2 needs to be capable of connecting to the remote network upon which the Analytics Application 116 is hosted. If additional devices 204 are incorporated into the sensing system, the active sensing area 202 is enhanced and/or extended according to the number and location of new devices available within the communication network 200 and their wireless communication range. Enhancement of the sensing area occurs as a result of the increase in the number of data sources available. Extension of the sensing area also occurs as a result of the increase in overall reach of the wireless network 200. The scope of the systems and methods proposed herein are not limited by any particular network topology. The communication network 200 could be created by following any of the regulated communication standards, e.g. IEEE 802.11 standard family or some new standard. Further embodiments of the invention support structured networks as well as ad-hoc networks.

Any of the transceivers 110 and/or 104 in FIG. 1 or Device 1, Device 2, Device N in FIG. 2 can read probing requests or any packet according to any of the standards mentioned herein without being associated with the device carried by the subject.

Accordingly, the method proposed herein analyses flows of the information or data collected by any of the transceivers 110 104 or Device 1, Device 2, Device N as described above with respect to FIG. 1. The information is the input to the methods proposed herein comprise a device-free approach for detecting motion plus a device-oriented approach where the system collects as much data as the devices in the system proposed herein can and that are defined above, such as PHY, MAC, LLC, and DL layer information, for example, from the device or devices that are not part of the system proposed herein, e.g. the mobile device and/or the smart watch worn by a person (subject) generating the motion in the sensing area 102 or 202 as in FIG. 1 and FIG. 2, respectively. The device-free approach may primarily analyze frequency response of the channel, and/or phase response of the channel, and/or impulse response of the channel, and/or, Channel State Information (CSI), and/or received signal strength indicators (RSSI) to determine whether there is motion or not within the sensing area 102. The device-oriented approach may primarily exploit probe request information or any signal that the device is transmitting in order to identify the device through the MAC address or any other signature that can be extracted from the devices comprising the system proposed herein.

According to other embodiments of the invention the system proposed herein can also create mechanisms for stimulating a target device or devices to be identified to keep transmitting signals by replying to a specific stimulus created by the system. For example, one of the transceivers 110 and/or 104 can create an SSID that is widely used in public spaces that offer free or not Wi-Fi services, e.g. free Wi-Fi, controlled access Wi-Fi through webpage (e.g. as employed in many retail environments) or paid Wi-Fi. Accordingly, the target device may get associated with the transceiver of the system according to an embodiment of the invention and expose its real MAC address instead of a random one. In the latter example, any other information that can serve to identify the target device will be collected and it is not limited only to the collection of a MAC address. For example, in the probe request there are multiple data fields that can be used as an input for an algorithm to identify the target device or devices later on.

The system proposed herein will use as many devices as available that can collect meaningful information for identifying the target device or devices when they are used somewhere else a posteriori or in-situs in the moment of an intrusion for example.

Accordingly, embodiments of the invention may include those implemented either in any of the devices forming the network, or in the cloud, or in an hybrid approach where some or all the devices in the network can partially compute, and/or cooperate with a cloud-based process 116 in the cloud system 118:

If in an intruder detection system or an area under surveillance motion is detected through a device-free sensing mechanism and an alarm, or alert, or flag variable, is set or goes off and a method as described below comprising:

Step 1: The transceivers 110 and/or 104 in the system proposed herein start identifying and/or collecting MAC addresses, probe requests and any of the information described above with respect to FIG. 1 over a period of time. The transceivers 110 and/or 104 collect as much information as possible in a listening mode or in a more active mode by interacting with the target device or devices with the appropriate standard for extracting information from the targets.

Step 2: MAC addresses, probe requests and any of the information described as described above with respect to FIG. 1 is compared to a previous set of observations of MAC addresses, probe requests and any of the information, such as PHY, MAC, LLC, and DL layer information, for example, to the motion detection event that triggered this routine, labelling this comparison as comparison A. MAC addresses, probe requests and any of the information, such as PHY, MAC, LLC, and DL layer information, for example, are compared to a set of authorized MAC addresses, probe requests and any of the information, such as PHY, MAC, LLC, and DL layer information, for example, where a routine can determine that the whole information in this data set belongs to an authorized user, labelling this as comparison B. From those two comparison routines may be executed according to whether the MAC address is new or not.

Step 3: If the MAC address is new, and/or there is no correlation between probe requests or any of the information, such as PHY, MAC, LLC, and DL layer information, for example, from the two comparisons A and B described above, then a Red Alarm or Red Alert is raised and MAC address(es), probe requests and any of the information, such as PHY, MAC, LLC, and DL layer information, for example, is recorded for future reference.

Step 4: If at least one MAC address is not new, and/or at least one device exhibits a correlation between its probe requests or any of the information, such as PHY, MAC, LLC, and DL layer information, for example, from the two comparison A and B described above, then an Orange Alert is raised and a call or a message to a known entity or entities is generated notifying the presence of a user of the system that was identified since they belong to a list of authorized device(s) with an specific MAC address, probe requests or any of the information, such as PHY, MAC, LLC, and DL layer information, for example, that identifies the device(s).

Step 5: If there are no probe requests to analyze or record, and none of the information, such as PHY, MAC, LLC, and DL layer information, for example, can help with the identification of the device or devices, such that there is no MAC address to analyze, then no identification of a potential device or devices is not possible, probably because the intruder has no wireless device with him/her, among other reasons, then an alarm is raised and/or an indication is set that subject (potential intruder) has not been identified.

In Step 1 regarding a potential interaction with the target device or target devices for extracting more information about them, then different stimulus or wireless signals can be sent from the system proposed herein. For example, the transceivers in the system can broadcast different well-known Wi-Fi network SSIDs and the MAC address of the target device or target devices might be revealed and captured by any of the transceivers proposed herein.

The information recorded in paragraph Step 3 can be any of the type of, and one element or subgroup of the information, such as PHY, MAC, LLC, and DL layer information, for example, can be used for identifying the target device or target devices and for the identification of the subject. The subject could be an intruder that is detected and/or identified with the systems and methods proposed herein.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

making a first determination by determining whether at least one of an acquired media protocol address of a wireless device associated with a subject within a sensing area is new and that there is no correlation of acquired wireless environment data whilst the subject is in motion with at least one of first stored data relating to authorized subjects and second stored data comprising wireless environment data established prior to the determination of motion of the subject;

making a second determination by determining whether at least one of a media protocol address of a wireless device associated with the subject is known and that there is a correlation of the acquired wireless environment data with at least one of first stored data relating to authorized subjects and second stored data comprising wireless environment data established prior to the determination of motion of the subject; and making a third determination by determining whether the subject is not associated with any wireless device.

2. The method according to claim 1, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by at least a further pair of wireless devices associated with the sensing area.

3. The method according to claim 1, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by the at least a pair of wireless devices associated with the sensing area.

4. The method according to claim 1, wherein the wireless environment data comprises at least one of wireless signals and wireless data received by at least a pair of wireless devices associated with the sensing area.

5. The method according to claim 1, further comprising upon making a positive first determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

6. The method according to claim 1, further comprising upon making a positive second determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

7. The method according to claim 1, wherein upon making a positive determination that subject is not associated with any wireless device at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

8. A method comprising:

determining whether a subject in motion within a sensing area is known or not known by:

making a first determination by determining whether at least one of an acquired media protocol address of a wireless device associated with a subject within a sensing area is new and that there is no correlation of acquired wireless environment data whilst the subject is in motion with at least one of first stored data relating to authorized subjects and second stored data comprising wireless environment data established prior to the determination of motion of the subject;

making a second determination by determining whether at least one of a media protocol address of a wireless device associated with the subject is known and that there is a correlation of the acquired wireless environment data with at least one of first stored data relating to authorized subjects and second stored data comprising wireless environment data established prior to the determination of motion of the subject; and making a third determination by determining whether the subject is not associated with any wireless device.

9. The method according to claim 8, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by at least a further pair of wireless devices associated with the sensing area.

10. The method according to claim 8, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by the at least a pair of wireless devices associated with the sensing area.

11. The method according to claim 8, further comprising performing an action of a plurality of actions; wherein the performed action of the plurality of actions is established in dependence upon the determination of whether the subject in motion within a sensing area is known or not.

12. The method according to claim 8, further comprising performing an action of a plurality of actions; wherein the performed action of the plurality of actions is established in dependence upon whether the first determination was positive, the second determination was positive or the third determination was positive.

13. The method according to claim 8, further comprising upon making a positive first determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

14. The method according to claim 8, further comprising upon making a positive second determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

15. The method according to claim 8, wherein upon making a positive determination that subject is not associated with any wireless device at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

16. A device comprising:

a microprocessor; and a memory storing executable instructions for execution by the microprocessor; wherein the executable instructions when executed cause the microprocessor to execute a process for determining whether a subject in motion within a sensing area is known or not known; and determining whether the subject in motion within a sensing area is known or not is established by a process comprising the steps of:

making a first determination by determining whether at least one of a media protocol address of a wireless device associated with the subject is new and that there is no correlation of the wireless environment data with at least one of first stored data relating to authorized subjects and second stored data comprising wireless environment data established prior to the determination of motion of the subject;

making a second determination by determining whether at least one of a media protocol address of a wireless device associated with the subject is known and that there is a correlation of the wireless environment data with at least one of first stored data relating to authorized subjects and second stored data comprising wireless environment data established prior to the determination of motion of the subject; and making a third determination by determining whether the subject is not associated with any wireless device.

17. The device according to claim 16, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by at least a further pair of wireless devices associated with the sensing area.

18. The device according to claim 16, further comprising determining that the subject is in motion within the sensing area by analysing other wireless environment data; wherein the wireless environment data comprises at least one of wireless signals and wireless data received by at least a pair of wireless devices associated with the sensing area; and the other wireless environment data comprises at least one of other wireless signals and other wireless data received by the at least a pair of wireless devices associated with the sensing area.

19. The device according to claim 16, further comprising performing an action of a plurality of actions; wherein the performed action of the plurality of actions is established in dependence upon the determination of whether the subject in motion within a sensing area is known or not.

20. The device according to claim 16, further comprising performing an action of a plurality of actions; wherein the performed action of the plurality of actions is established in dependence upon whether the first determination was positive, the second determination was positive or the third determination was positive.

21. The device according to claim 16, further comprising upon making a positive first determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

22. The device according to claim 16, further comprising upon making a positive second determination at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

23. The method according to claim 16, wherein upon making a positive determination that subject is not associated with any wireless device at least one of:

notifying the presence of the subject to a predetermined entity;

communicating the presence of the subject to an electronic device associated with the sensing area;

communicating the presence of the subject to another electronic device associated with the sensing area together with at least one of a first predetermined subset of the wireless environment data and the media protocol address; and notifying the presence of the subject to another predetermined entity together with at least one of a first predetermined subset of the wireless environment data and the media protocol address.

* * * * *